US008700924B2

(12) United States Patent
Mian et al.

(10) Patent No.: US 8,700,924 B2
(45) Date of Patent: Apr. 15, 2014

(54) MODULAR SENSOR NODE AND COMMUNICATIONS SYSTEM

(75) Inventors: Zahid F. Mian, Loudonville, NY (US); Ryk E. Spoor, Troy, NY (US); Bruce P. McKenney, Selkirk, NY (US); Peter R. Hayes, Delmar, NY (US); Randy A. Leet, Glenville, NY (US)

(73) Assignee: International Electronic Machines Corp., Troy, NY (US)

( * ) Notice: Subject to any disclaimer, the term of this patent is extended or adjusted under 35 U.S.C. 154(b) by 1323 days.

(21) Appl. No.: 12/469,167

(22) Filed: May 20, 2009

(65) Prior Publication Data

US 2009/0300379 A1 Dec. 3, 2009

Related U.S. Application Data (60) Provisional application No. 61/054,907, filed on May 21, 2008.

(51) Int. Cl.
*G06F 1/26* (2006.01)

(52) U.S. Cl.
USPC ........... 713/300; 713/310; 713/320; 370/311; 370/338; 370/347

(58) Field of Classification Search
USPC ........... 713/300, 310, 320; 370/311, 338, 347
See application file for complete search history.

(56) References Cited

U.S. PATENT DOCUMENTS

| 4,524,620 | A | 6/1985 | Wright et al. |
|---|---|---|---|
| 5,216,631 | A | 6/1993 | Sliwa, Jr. |
| 5,307,311 | A | 4/1994 | Sliwa, Jr. |
| 5,621,669 | A * | 4/1997 | Bjornsson ................. 702/85 |
| 5,915,120 | A * | 6/1999 | Wada et al. ................ 713/310 |
| 5,970,393 | A | 10/1999 | Khorrami et al. |
| 6,014,896 | A | 1/2000 | Schoess |
| 6,076,405 | A | 6/2000 | Schoess |
| 6,192,759 | B1 | 2/2001 | Schoess |
| 6,278,379 | B1 | 8/2001 | Allen et al. |
| 6,319,208 | B1 | 11/2001 | Abita et al. |
| 6,321,602 | B1 | 11/2001 | Ben-Romdhane |
| 6,388,609 | B2 * | 5/2002 | Paese et al. ................. 342/27 |
| 6,392,584 | B1 | 5/2002 | Eklund |
| 6,693,548 | B2 | 2/2004 | Boyce et al. |
| 6,799,126 | B1 | 9/2004 | Ratcliffe et al. |
| 6,816,510 | B1 * | 11/2004 | Banerjee ................. 370/503 |
| 7,145,265 | B2 * | 12/2006 | McNulty et al. ........... 307/44 |
| 7,386,352 | B2 * | 6/2008 | Davis et al. ................ 700/9 |
| 7,427,916 | B2 * | 9/2008 | Matsumoto et al. ........ 340/521 |

(Continued)

OTHER PUBLICATIONS

S.W. Arms et al.; Tracking Pitch Link Dynamic Loads w/ Energy Harvesting Wireless Sensors, www.microstrain.com, May 2007, 41 pages.

(Continued)

*Primary Examiner* — Kim Huynh
*Assistant Examiner* — Zahid Choudhury
(74) *Attorney, Agent, or Firm* — LaBatt, LLC (57) ABSTRACT

A sensor node for use in a sensor system includes a core component a sensor component and a power component. The core component includes processing and transmission/receiving components. Additionally, the core component includes interfaces for selectively connecting sensor and power components of any one of a plurality of types. In this manner, the core component enables the corresponding power and sensor components to be matched according to a particular application to generate the desired sensor node.

20 Claims, 9 Drawing Sheets

(56) References Cited

U.S. PATENT DOCUMENTS

| | | | |
|---|---|---|---|
| 7,593,752 B2* | 9/2009 | Ara et al. | 455/561 |
| 2002/0017908 A1* | 2/2002 | Macke et al. | 324/555 |
| 2003/0006668 A1 | 1/2003 | Lal et al. | |
| 2004/0008651 A1 | 1/2004 | Ahmed | |
| 2004/0217881 A1* | 11/2004 | Pedyash et al. | 340/870.07 |
| 2005/0074025 A1* | 4/2005 | Shao et al. | 370/461 |
| 2005/0262943 A1 | 12/2005 | Claydon et al. | |
| 2006/0056370 A1* | 3/2006 | Hancock et al. | 370/338 |
| 2006/0080048 A1 | 4/2006 | Kessler et al. | |
| 2006/0140123 A1* | 6/2006 | Conner et al. | 370/238 |
| 2006/0170535 A1 | 8/2006 | Watters et al. | |
| 2006/0176169 A1* | 8/2006 | Doolin et al. | 340/521 |
| 2006/0176175 A1* | 8/2006 | Evans et al. | 340/539.22 |
| 2006/0267167 A1 | 11/2006 | McCain | |
| 2007/0062299 A1 | 3/2007 | Mian et al. | |
| 2007/0285248 A1 | 12/2007 | Hamel et al. | |
| 2009/0261973 A1* | 10/2009 | Eakle, Jr. | 340/540 |
| 2010/0034191 A1* | 2/2010 | Schulz | 370/350 |
| 2010/0142422 A1* | 6/2010 | Al-Wakeel et al. | 370/311 |
| 2011/0077785 A1* | 3/2011 | Nickerson et al. | 700/284 |
| 2011/0261738 A1* | 10/2011 | Mukherjee | 370/311 |

OTHER PUBLICATIONS

ANT11TR21M2xB RF Transceiver Module, Dynastream Innovations Inc., Revision 2.1, pp. 1-14, 2007, Cochrane, Alberta.

EM260—802.15.4 and ZigBee Compliant Network Co-processor, Ember Corporation, 2 pages, 2008.

Getting Started With MSP430 from Texas Instruments, printed from http://focus.ti.com/mcu/docs/mcugettingstarteddetail.tsp?sectionId=97&tabId=1511&famil . . . on Apr. 17, 2009, 3 pages.

Wireless Network Uses "Smart Dust" Technology, SAIC Magazine, 2 pages, Winter 2004/2005.

Crossbow IMOTE2.Builder—Wireless Sensors for Everyone, Crossbow, 5 pages, date unknown.

uPSD3300 series—Turbo 8032 Microcontroller With Programmable Logic, STMicroelectronics, 2 pages, Aug. 2003.

Zarlink Introduces World's First Wireless Chip Designed Specifically for In-Body Communication, printed from http://www.zarlink.com/zarlink/hs/press_releases_7658.htm, 3 pages, May 31, 2005.

Crossbow Technologies, Inc., MICA2 Datasheet, file creation date of Mar. 19, 2007 (downloaded from http://bullseye.xbow.com:81/Products/Product_pdf_files/Wireless_pdf/MICA2_Datasheet.pdf on Dec. 26, 2012).

C.-Y. Lee, G.-B. Lee. "MEMS-Based Humidity Sensors with Integrated Temperature Sensors for Signal Drift Compensation" Sensors, 2003. Proceedings of IEEE. pp. 384-388. Accessed online on Oct. 30, 2007. <http://ieeexplore.ieee.org/>.

Y.B. Jeon, R. Sood, J.-h. Jeong, S.-G. Kim "MEMS power generator with transverse mode thin film PZT" Sensors and Actuators A. 122. 2005. pp. 16-22. Accessed online on Oct. 30, 2007. <www.sciencedirect.com>.

E. Vittoz. "Future of analog in the VLSI environment." Circuits and Systems, 1990. IEEE International Symposium. vol. 2. pp. 1372-1375. Accessed online on Oct. 30, 2007. <http://ieeexplore.ieee.org/>.

S. Roundy, P.K. Wright, J. Rabaey. "A study of low level vibrations as a power source for wireless sensor nodes" Computer Communications 26. 2003. pp. 1131-1144. Accessed online on Oct. 30, 2007. <www.elsevier.com>.

Sandia National Laboratories, Microsystems Science, Technology, and Components division, printed from http://www.sandia.gov/mstc/ and others, dates unknown, printed on May 13, 2008, 7 pages.

Warneke and Pister, "MEMS for Distributed Wireless Sensor Networks," 9th Int'l Conf on Electronics, Circuits and Systems, Dubrovnik, Croatia, Sep. 15-18, 2002, 27 pages.

Clark T.-C. Nguyen, Transceiver Front-End Architectures Using Vibrating Micromechanical Signal Processors. Digest of Papers, Topical Meeting on Silicon Monolithic Integrated Circuits in RF Systems, Sep. 2001, pp. 23-32.

Imed Zine-El-Abidine, Michal Okoniewski and John G. McRory: A New Class of Tunable RF MEMS Inductors, Proceedings of the International Conference on MEMS, NANO and Smart Systems (ICMENS 2003), pp. 1-2.

Rijks, Vanbeek, Steeneken et. al., MEMS Tunable Capacitors and Switches for RF Applications, Proceedings of the 24th International Conference on Microelectronics, vol. 1, pp. 49-56, May 2004.

E.P. James, M.J. Tudor, S.P. Beeby, N.R. Harris, P. Glynne-Jones, J.N. Ross, N.M. White "An Investigation of Self-Powered Systems for Condition Monitoring Applications" Sensors and Actuators A 110 2004 pp. 171-176. Accessed online on Oct. 30, 2007. <www.elsevier.com>.

Mitcheson et. al., MEMS electrostatic micropower generator for low frequency operation, Sensors and Actuators A, 115, pp. 523-529, 2004.

Kenneth C. Bradley, Mechanical Computing in Microelectromechanical Systems (MEMS), Thesis, Graduate School of Engineering and Management of the Air Force Institute of Technology Air University, Mar. 25, 2003, 172 pages.

http://www.tplinc.com/HTM/MICROCAPS.HTM, 2 pages, printed on Aug. 31, 2006.

* cited by examiner

MODULAR SENSOR NODE AND COMMUNICATIONS SYSTEM

REFERENCE TO PRIOR APPLICATIONS

The current application claims the benefit of U.S. Provisional Application No. 61/054,907, titled "Sensor System", which was filed on 21 May 2008, and which is hereby incorporated by reference. Aspects of the current application are related to U.S. Utility application Ser. No. 11/532,212, titled "MEMS-based Monitoring", which was filed on 15 Sep. 2003 and issued as U.S. Pat. No. 7,412,899 on 19 Aug. 2008, and which is hereby incorporated by reference.

GOVERNMENT LICENSE RIGHTS

The U.S. Government has a paid-up license in this invention and the right in limited circumstances to require the patent owner to license others on reasonable terms as provided for by the terms of Contracts N68335-06-C-0216 and N68335-06-C-0217 awarded by the United States Navy/NAVAIR.

TECHNICAL FIELD

The disclosure relates generally to monitoring systems, and more particularly, to an improved sensor node.

BACKGROUND ART

Current wireless sensor approaches include miniature sensor nodes and a receiving station. The receiving station receives data from the sensor nodes and processes the data and/or forwards the data to a central collection station.

To date, the miniature sensor nodes are typically manufactured as a single, integrated unit. For example, a node may be configured as a strain sensor, a temperature sensor, an accelerometer sensor, or the like. When a different type of sensor is required, a new sensor node must be designed and manufactured. Even when two different sensor nodes incorporate overlapping functionality, one sensor node cannot be reconfigured to perform as an alternative type of sensor node. One approach offers a sensor research development platform that enables some flexibility when testing and developing new sensor nodes. However, the platform is much larger than a typical sensor node and is neither intended for nor optimized for actual implementations.

Similarly, the sensor nodes also are designed for a particular power source, and therefore cannot readily change from one type of power source to another. As a result, different sensor nodes must be designed to include a particular power source that is conducive for different application environments (e.g., sunny, outdoor environment versus in a warehouse), which may require the same sensing capability. In modern computing devices, the manufacturing trend is also towards integration of numerous functions into a single component. For example, a motherboard for a modern personal computer includes several functions, such as video, I/O ports, etc., which were previously included on separate microcomputers.

Further, power consumption is frequently a limiting factor in the sampling and transmission rates for current sensor nodes. In general, higher sampling and/or transmission rates require additional power consumption. Because of the limited amount of available power in current sensor nodes, sampling and transmission rates are typically very low. The transmission rate is also limited by the type of network in which sensor nodes are deployed. In particular, most multiple sensor node networks are mesh networks, which generally cannot effectively use more than approximately twenty percent of their nominal bandwidth due to data collision resolution and data relaying requirements.

Various potential applications for sensor nodes also present unique challenges. For example, the use of sensor nodes could improve a Health and Usage Monitoring System (HUMS) and/or Condition Based Management (CBM) for one or more components of machinery, such as a helicopter. In this environment, various moving components make attachment and interrogation of the sensor nodes difficult. Additionally, a large amount of vibration may be present, and high speed sampling is often desired. Since many approaches fail to address all of these challenges, current practice requires schedule-based maintenance that includes regular inspections of all of the components of interest and components are often removed and discarded after a period of time and/or amount of usage, often well before the components have approached their true useful lifetime. This situation poses a higher risk of injury to the inspectors/maintenance individuals, and costs billions of dollars annually.

Another potential application is the use of sensor nodes for performing security monitoring. In these applications, multiple possible sensor types (e.g., cameras, microphones, magnetometers, geophones, and/or the like) may be desired. Further, the sensor nodes may need to be capable of covert placement, secure data transmission and storage, and/or independent operation for long periods of time. To date, most approaches use sensors that are wired for power and/or data transmission. Further, human observers/patrols and passive barriers (e.g., fencing) are often utilized due to the limitations of current sensor-based approaches. The continued use of human observers/patrols results in limited monitoring, which also is extremely expensive.

Still another potential application is the use of sensor nodes for performing safety and/or process monitoring (e.g., vehicle monitoring). These applications require a wide range of demands depending on the needs of the particular application. To this extent, numerous different types of sensors may be required and sampling rates may vary from one sample per several minutes to thousands of samples per minute. Current approaches continue to rely on maintenance and posted safety procedures (e.g., vehicle inspections) to avoid unsafe events. To date, some approaches use cameras (e.g., rail crossings, operation areas) and chemical/physical sensors for process monitoring. However, these approaches nearly always use wired sensors. The current approaches rely on individual compliance, which can increase a likelihood of injuries, and result in lost work, production, and operational times.

SUMMARY OF THE INVENTION

Aspects of the invention provide an improved sensor node for use in a sensor system. In particular, the sensor system incorporates a set of sensor nodes for acquiring sensor data. Each sensor node is manufactured using separate components that can be matched according to a particular application.

A first aspect of the invention provides a sensor node comprising: a core component including: a power interface configured to selectively connect the core component to any one of a plurality of types of power components; a sensor interface configured to selectively connect the core component to any one of a plurality of types of sensor components; a microprocessor configured to process sensor data; and a wireless transceiver configured to communicate data; a sensor component connected to the sensor interface, the sensor component including at least one sensor for acquiring the sensor data; and a power component connected to the power interface, wherein the power component is configured to supply power to the sensor node.

A second aspect of the invention provides a core component for a sensor node comprising: a power interface configured to selectively connect the core component to any one of a plurality of types of power components; a sensor interface configured to selectively connect the core component to any one of a plurality of types of sensor components; a microprocessor configured to process sensor data; and a wireless transceiver configured to communicate data.

A third aspect of the invention provides a sensor system comprising: a sensor node including: a core component including: a power interface configured to selectively connect the core component to any one of a plurality of types of power components; a sensor interface configured to selectively connect the core component to any one of a plurality of types of sensor components; a microprocessor configured to process sensor data; and a wireless transceiver configured to communicate data; a sensor component connected to the sensor interface, the sensor component including at least one sensor for acquiring the sensor data; and a power component connected to the power interface, wherein the power component is configured to supply power to the sensor node; and a processing node configured to receive sensor data from the sensor node and process the sensor data.

A fourth aspect of the invention provides a method of manufacturing a sensor node, the method comprising: selecting at least one sensor and at least one power source based on an application; obtaining a sensor component including the selected at least one sensor; obtaining a power component including the selected at least one power source; and connecting the sensor component and the power component to a core component.

A fifth aspect of the invention provides a system comprising: a plurality of nodes; and a central node, wherein the plurality of nodes communicate with the central node using a Time Division Multiple Access (TDMA) communications network, and wherein each of the plurality of nodes synchronizes an internal clock with an internal clock of the central node using an arrival time of a packet received from the processing node and a timestamp included in the packet.

A sixth aspect of the invention provides a method of communicating with a central node, the method comprising: communicating a message to the central node using a slot in a Time Division Multiple Access communications network; receiving a message from the central node, the message including a timestamp for the message; and synchronizing an internal clock with an internal clock of the central node using an arrival time of the message and the timestamp.

The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

It is noted that the drawings are not necessarily to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

The inventors recognize that current sensor node designs can be improved. In particular, current sensor node designs are inflexible due to their requirements for re-design for each new application and/or power source that is desired. Further, current sensor nodes are not capable of being deployed for applications that require high sampling rates and/or high transmission rates. Still further, current power requirements of sensor nodes results in an inability to perform independently (e.g., using a battery and/or power harvesting device) without a disproportionately large battery and/or power harvesting device (e.g., several times the volume of the sensing device).

As indicated above, aspects of the invention provide an improved sensor node for use in a sensor system. In particular, the sensor system incorporates a set of sensor nodes for acquiring sensor data. Each sensor node is manufactured using separate components that can be matched according to a particular application. As used herein, unless otherwise noted, the term "set" means one or more (i.e., at least one) and the phrase "any solution" means any now known or later developed solution.

Sensor System Nodes

Figure 1:
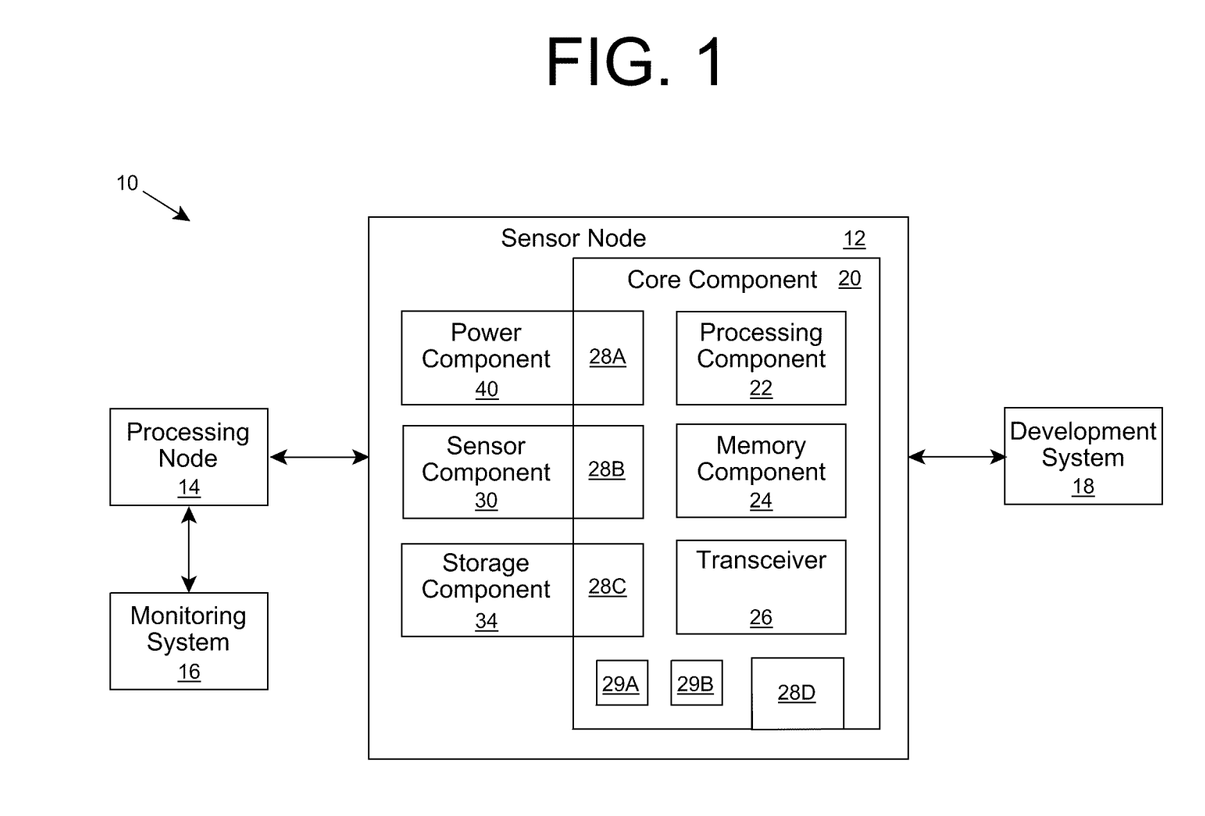
FIG. 1 shows an illustrative sensor system according to an embodiment.

Turning to the drawings, FIG. 1 shows an illustrative sensor system 10 according to an embodiment. In particular, sensor system 10 includes a sensor node 12, which is configured to acquire sensor data. Sensor node 12 can communicate the sensor data and/or data derived therefrom to a processing node 14. Processing node 14 can process the data received from sensor node 12 and communicate data to a monitoring system 16. Monitoring system 16 can comprise any type of computing system, which can incorporate one or more of any type of computing devices.

In an embodiment, sensor node 12 comprises a miniature sensor node (e.g., an inch-scale device), which is capable of wireless, independent operation. To this extent, sensor node 12 can communicate using a wireless communications solution, and can be self-powered through the use of a battery, power harvesting solution, and/or the like. The total power requirements for sensor node 12 can be within the low milliwatt (mW) range, e.g., less than approximately 2 milliwatts. For example, for a 4 kHz sampling rate and real time wireless data transmission, the total power requirements can be approximately 1.8 mW. Data can be acquired and stored, without transmission, at an even higher rate with the same or lower power requirements, while power requirements for lower sampling and/or transmission rates can be proportionately lower. Further, sensor node 12 can include one or more of various types of sensors, which can be selected based on the particular application. In this case, sensor node 12 can provide a solution that enables various components/areas to be monitored for extended periods, which were previously difficult or impossible to monitor.

Sensor node 12 is manufactured using a modular approach. To this extent, sensor node 12 includes a core component 20, which includes a processing component 22, a memory component 24, and a transceiver 26. Further, core component 20 includes a set of interfaces 28A-D, each of which is configured to selectively connect core component 20 to another component. The connection can be made detachable or permanent, and can be implemented using any solution (e.g., male/female connectors). For example, core component 20 can include a power interface 28A, which is configured to connect a power component 40 to core component 20. Further, core component 20 can include one or more sensor interfaces 28B, each of which is configured to connect a sensor component 30 to core component 20. Still further, core component 20 can include one or more other types of interfaces, such as a storage interface 28C, which is configured to connect a storage component 34 to core component 20, a programming interface 28D, which is configured to provide an interface to a development system 18, and/or the like. It is understood that core component 20 can include additional components 29A-B. For example, components 29A-B can comprise a set of power regulators configured for both digital and analog voltage inputs, which enable use of multiple, different power components 40.

Use of a modular approach for sensor node 12 separates the functionality into three or more components 20, 30, 40, 34, each of which can be independently addressed while leaving the other components untouched. The most common differences between different sensor nodes 12 is with respect to their specific sensor or sensors, the specific data collection and communications demands involved in their operation, and the power source used to run them. Sensor node 12 provides an ability to change one or more of these functions without requiring a re-design of the entire sensor node 12. For example, to sense a different quantity (e.g., change between strain, vibration, sound, heat, and/or the like), sensor component 30 is the only component of sensor node 12 that will require changing (although core component 20 may require different software to execute). Similarly, a change in the power source only requires power component 40 to be changed. Still further, a change in a communication methodology may require a modification of core component 20, but no change will be required to any of the other components 30, 40, 34.

Processing component 22 can control the operation of sensor node 12. To this extent, processing component 22 can acquire data from sensor component 30, control the transmission of data to a processing node 14, and/or the like. Additionally, processing component 22 can perform other functions. For example, processing component 22 can process the raw sensor data received from sensor component 30 to transform the raw sensor data into sensor data that is ready for processing by processing node 14. Illustrative processing that can be performed by processing component 22 includes, but is not limited to, filtering (e.g., band-pass, high-pass, or the like), running average(s) calculation, threshold detection, activation/deactivation of sensors, and/or the like. An appropriate processing component 22 can be selected using any solution, e.g., based on one or more operating characteristics including, but not limited to, processing speed, power demand, size, memory, device control capability, and/or the like. In an embodiment, processing component 22 comprises an ultra-low-power microcontroller capable of operating at approximately 250 microamperes or less when active. In a further embodiment, processing component 22 is capable of receiving and processing sensor data in excess of ten thousand samples per second.

Transceiver 26 can transmit data using any solution, e.g., any wireless solution. Use of a wireless transceiver 26 eliminates a requirement for wired connections for communications for data, control, alerts, etc. In an embodiment, transceiver 26 comprises an RF transceiver. However, it is understood that transceiver 26 can implement any wireless communication method including, for example, acoustic, light-based, and/or the like, and/or any wired communication method. In a further embodiment, transceiver 26 comprises a low-power transceiver 26. To this extent, transceiver 26 can operate using approximately 5-35 milliamperes (mA) or less of current when active. An appropriate transceiver 26 can be selected using any solution, e.g., based on one or more operating characteristics including, but not limited to, an operating range, bandwidth, programmability, security, size, power requirements, and/or the like. In an embodiment, transceiver 26 can transmit sensor data in excess of ten thousand samples per second.

The inclusion of memory component 24 in core component 20 and/or an additional storage component 34 can address a number of potential issues in various applications in which sensor node 12 may be implemented. For example, wireless transmission of data is well known to be subject to data loss ("drop-out") due to interference and/or other phenomena. If an application requires that an entire sequence of data be captured with no drop-out, e.g., as may be needed for engineering studies of transient phenomena, the onboard memory can provide a reliable source of back-up data, which will allow recovery of any data that failed in transmission. Similarly, an application in which a sensor node 12 is deployed may include time periods during which wireless transmission is not permitted and/or possible. For example, a sensor node 12 may be deployed to monitor one or more aspects of operation of a machine, such as an aircraft (fixed-wing or rotorcraft), which does not permit any RF transmission while in flight that is not directly necessary to the operation of the craft itself. In such an application, memory component 24 and/or storage component 34 can serve as a long-term buffer to store the sensor data until RF transmission is allowed and/or possible, e.g., after the aircraft lands. To this extent, the RF transmission can be triggered by, for example, a query or other activation signal, which is sent by a processing node 14.

Figure 2A:
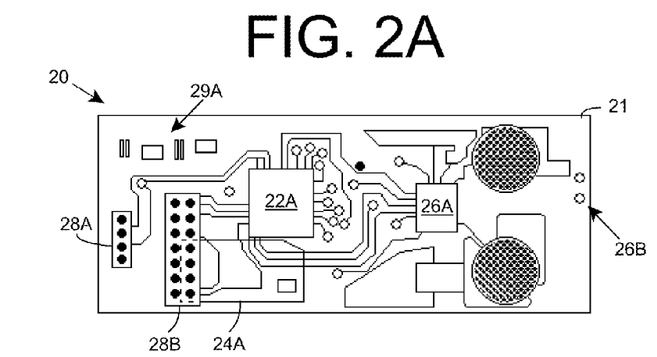
FIGS. 2A-2C show illustrative implementations of the core component, power component, and sensor component, respectively, according to embodiments of the invention.
Figure 2B:
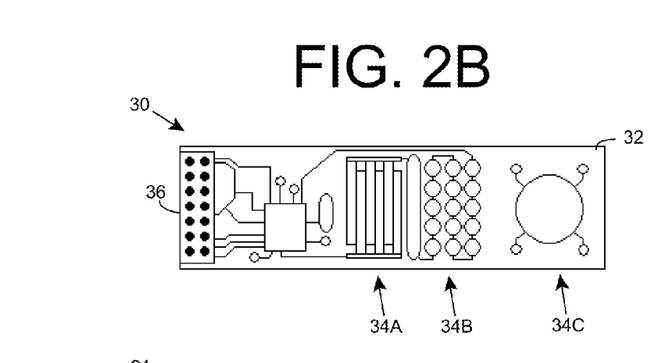
Figure 2C:
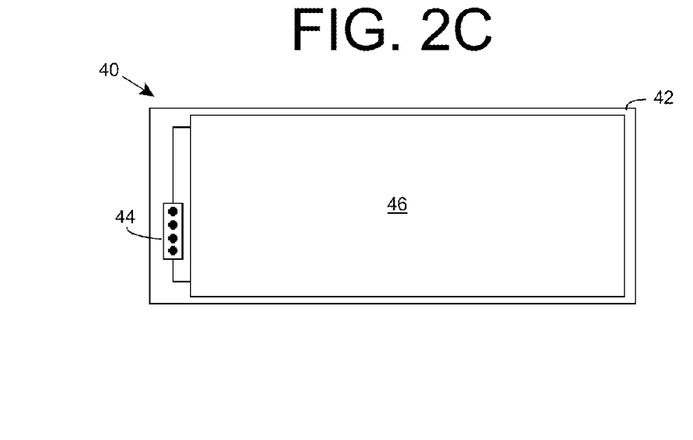

FIGS. 2A-2C show illustrative implementations of the core component 20, sensor component 30, and power component 40, respectively, according to embodiments of the invention. As illustrated, core component 20 is implemented as a core board 21 that includes a power and programming interface 28A, a multiple input sensing interface/ADC interface 28B, a microprocessor/microcontroller 22A, and communication capability (e.g., transceiver 26A and antenna connectors 26B). Power regulators 29A are included for both digital and analog voltage inputs, allowing a wide variety of power sources to be used without modification. Additionally, core component 20 includes onboard memory 24A and provisions for an optional memory module of, for example, 1 GB or more capacity. Core component 20 could have other components added to it, such as a GPS receiver, for use in various applications. Further, core component 20 could include an integral antenna in addition to or alternative to the external antenna connectors 26B. In an embodiment, core board 21 is approximately two inches long and approximately three-quarters of an inch wide.

Sensor component 30 is implemented as a sensor board 32, which may have some number (one or more) of sensors 34A-34C and the corresponding sensor support circuitry of various types on it or connectable to it. While sensor board 32 is shown including three sensors 34A-34C, it is understood that sensor board 32 can include any number of one or more sensors. In an embodiment, sensor board 32 can include up to four sensors 34A-34C. The sensor board 32 includes a connector 36 that is configured to interface with the core component 20 through the multiple-input sensing interface 28B on the core board 21. Additionally, the sensor board 32 can incorporate an FET-switch based methodology, which enables complete power down of all sensor features, even bridge circuitry, e.g., for a strain gauge, and thereby enables significant power savings for the wireless sensor node 12 (FIG. 1). In an embodiment, sensor board 32 includes a set of switches that enable one or more of the sensors 34A-34C to be shutdown individually or as a group. In a further embodiment, the set of switches are operated programmatically by the processing component microprocessor 22A.

The sensor(s) 34A-34C and sensor support circuitry included in sensor component 30 can be selected using any solution based on a particular application for sensor node 12 (FIG. 1). In particular, the selected sensor(s) 34A-34C can be configured to sense changes in one or more relevant parameters of an object/area. Illustrative sensors include, but are not limited to, a strain gauge, accelerometer, vibration, temperature, acoustic, and/or the like. In general, a sensor can comprise a transducer, which converts one form of input energy into output energy of another form. In addition to the particular parameter(s) to be monitored, a sensor can be selected based on other factors including, but not limited to, power demand, size, sensitivity/resolution/accuracy, range, and/or the like. In an embodiment, the sensor(s) in sensor component 30 can require a total power in the sub-milliwatt range. In a further embodiment, one or more sensor(s) in sensor component 30 can acquire samples at a rate in excess of ten thousand samples per second. An illustrative sensor comprises a MEMS-based piezoresistive strain gauge with a temperature sensor. The strain gauge can measure strain in two dimensions with a check element, and the temperature sensor can provide calibration. In this case, the strain gauge can be implemented in a 1.5 mm by 1.5 mm space, and operate using approximately 1-10 microwatts of power.

Power component 40 is implemented as a power board 42, which includes a connector 44 that is configured to interface with the core component 20 through the power/programming interface 28A on the core board 21. The power board 42 can comprise one or more of any type of power sources 46 capable of providing power to core component 20 and sensor component 30. For example, power source 46 can comprise a harvesting device (e.g., solar, piezoelectric, electromagnetic, etc.), which can be selected based on an application for the sensor node 12. Additionally, the power source 46 can comprise a battery, micro-fuel cell, and/or other power storage device(s). Still further, when wired operation is possible, power board 42 can include components that enable power component 40 to obtain power from an existing power source external to sensor node 12. The power source(s) 46, such as power harvesting device(s) and/or power storage device(s), included in power component 40 can be selected to provide sufficient peak power to the various components of sensor node 12 for a desired length of deployment of sensor node 12 without access to any external power sources. Additionally, other factors, including but not limited to, a desired size, operating environment, and/or the like, can be used to select the desired device(s) for power component 40.

Figure 3A:
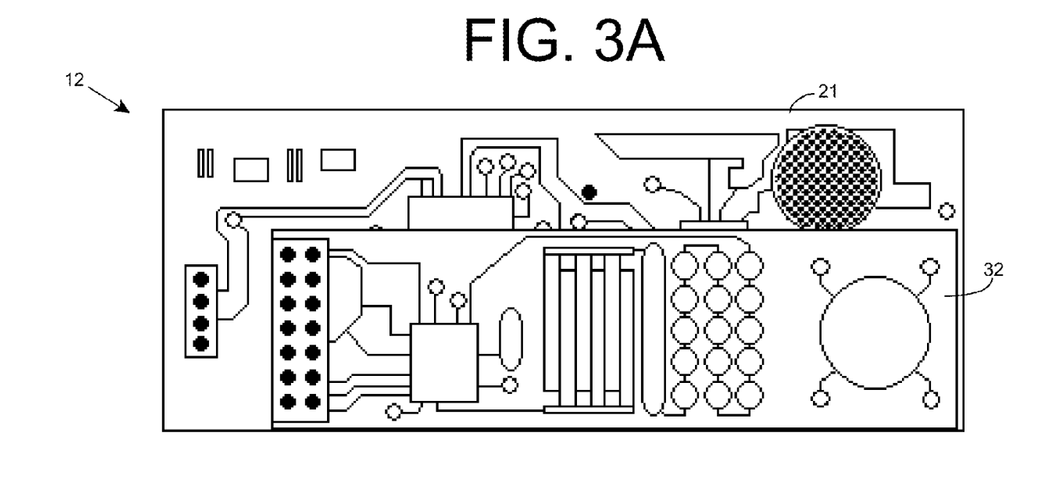
FIGS. 3A-3B show top and side views, respectively, of an illustrative sensor node, which is implemented using the illustrative boards of FIGS. 2A-2C according to an embodiment.
Figure 3B:
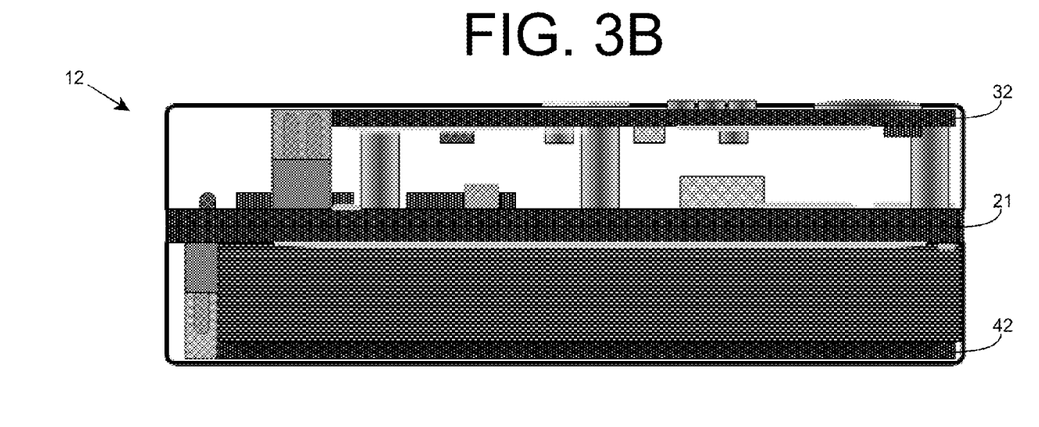

FIGS. 3A-3B show top and side views, respectively, of an illustrative sensor node 12, which is implemented using the illustrative boards 21, 32, 42 of FIGS. 2A-2C according to an embodiment. As illustrated, since sensor node 12 includes three boards 21, 32, 42, a total surface area required for sensor node 12 can be reduced as compared to single board sensor nodes, since components can be located above one another on different boards.

While primarily shown and described as a new sensor node 12, it is understood that aspects of the invention further provide various alternative embodiments. For example, in one embodiment, the invention provides a method of manufacturing a sensor node using several components. Initially, a developer can analyze an application and select an appropriate set of sensors and power sources based on the application using any solution. Subsequently, a sensor component that includes the set of sensors (e.g., sensor board 32) can be obtained using any solution. For example, a sensor board 32 may be already available, or may require customized development. Similarly, a power component that includes the set of power sources can be obtained. The sensor component and power component can be connected to a core component using the various interfaces, and an appropriate packaging can be utilized. Further, the core component can be programmed for the application.

Figure 4:
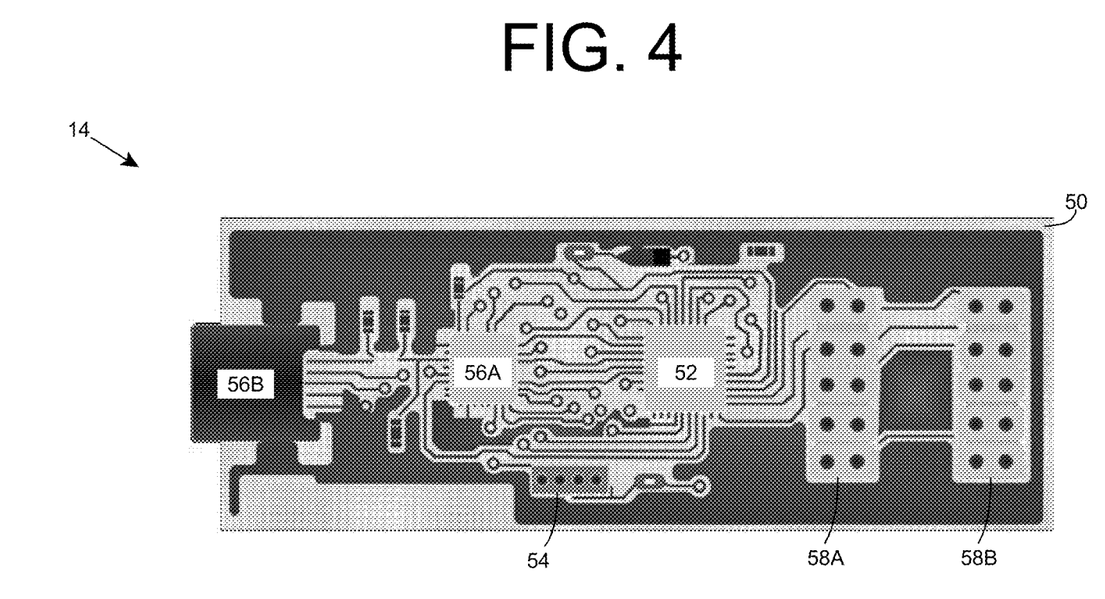
FIG. 4 shows an illustrative implementation of a processing node according to an embodiment.

Referring to FIG. 1, processing node 14 can communicate with sensor node(s) 12, to collect the sensor data, control network operations, and/or the like. Processing node 14 can comprise a more powerful computing device that acquires and processes the data. Alternatively, processing node 14 can acquire the sensor data and transmit (e.g., wirelessly) to another computing device, e.g., monitoring system 16, for processing. FIG. 4 shows an illustrative implementation of processing node 14 according to an embodiment. As illustrated, processing node 14 also can utilize a modular design. In an embodiment, processing node 14 is configured in a manner to receive power from an existing, external power source. In this case, processing node 14 can communicate with one or more computing devices using a wired transmission solution, while communicating with sensor node(s) using a wireless transmission solution. In another embodiment, processing node 14 includes a power component, which is configured to supply all of the power for the processing node 14 without access to any external power sources.

A core unit 50 for processing node 14 can include: at least one microprocessor 52; a power and programming interface 54; a USB interface (e.g., USB interface chip 56A and USB connector 56B) for power and/or data acquisition; and an interface 58A-58B for an RF transmitter unit (transceiver connector), which provides the core functionality of the sensor node(s) 12 (FIG. 1)/processing node 14 network. An illustrative implementation of core unit 50 is approximately 2⅜" in length and approximately ⅞" in width. While a USB interface is shown, it is understood that any type of interface, such as Ethernet, Firewire, and/or the like, can be implemented. Processing node 14 can be connected directly to a computing device, such as monitoring system 16 (FIG. 1), using a wired communications solution, Alternatively, processing node 14 can be placed in the field and can be configured with a more powerful wireless transmitter than sensor node(s) 12, which will enable processing node 14 to relay data received from sensor node(s) 12 over longer ranges for processing by another processing node 14 and/or monitoring system 16.

In an embodiment, processing node 14 includes at least two interfaces 58A-58B for RF transmitter units, which can provide flexibility in programming and in RF technology, since the core RF technology can be changed by a modification in the processing node 14 programming and plugging in the new RF transceivers, rather than having to redesign the processing node 14 board. Processing node 14 also can incorporate, e.g., through one of the RF interfaces 58A-58B or through a USB device, communication methodologies for other types of wireless networks such as ZigBee, WiFi, and/or the like. Regardless, it is understood that other types of wired and/or wireless connectivity designs could be implemented according to embodiments.

Sensor System Communications

Referring to FIG. 1, to date, most low-power wireless sensor systems use a form of the ZigBee (based on IEEE 802.15.4 standard), which limits throughput of data severely, even when the RF chips themselves are theoretically capable of much higher throughput. In particular, since most such systems are using a "mesh" network, in which all nodes act as relays for data through the system, a vast amount of their capability is used to manage this communication approach. It has been estimated that saturation of a ZigBee network occurs at around 20% of the theoretical maximum throughput.

In addition to the overhead caused by the mesh design—constant checks to see if all data has been transmitted through the system, additional transmission burden from relaying information from remote nodes, etc.—another, perhaps even more significant, source of network saturation comes from the basic communication design of the network. In particular, these networks make use of a Carrier Sense Multiple Access/Collision Avoidance (CSMA/CA) design, which employs a method of collision avoidance that comprises listening (Carrier Sensing) for silence on the channel for a certain time period before sending a packet. Two phenomena thus cause significant loss of effective transmission time: the enforced wait for silence for every node—i.e., all nodes must constantly spend at least some time in every cycle waiting to determine if they can safely transmit; and additional loss of time when two or more nodes, having waited, attempt to transmit in the same timeframe (collision) and then have to reset and wait again. As the number of nodes in the network increases, the chances of a collision increase drastically.

An alternative communications approach is Time Division Multiple Access (TDMA). In TDMA, each node of a network is assigned some timeslot for communication and will communicate only in that slot of time. An analogy of the difference between the two methods would be to compare the decision to transmit data to making the decision to cross a road. Using CSMA/CA, one would watch the cars passing, and when you haven't seen a car pass for some set period of time, cross. Using TDMA, one would wait for a green light, and then cross. Anyone familiar with traffic patterns can see that the CSMA/CA approach may work on lightly traveled roads with well-known flow characteristics, but is an invitation to disaster on a heavily traveled road. However, the TDMA approach is a much more reliable method to cross safely. In TDMA, each communicating entity has, in fact, its own "green light", and acts only at its own specific time, thus assuring no collisions.

However, using the standard TDMA approach in a wireless network of this type is also problematic. TDMA approaches work by creating a set of "slots" of time (time division) which are assigned to individual communicating entities (multiple access). As this is a division of absolute time, one of the most crucial aspects of TDMA has always been managing the synchronization of the "clocks" of all participants. The original application of TDMA was for very large communication systems. In this environment, a central timekeeping node can be used, which strictly synchronizes all communications to a very fine degree. However, with wireless devices in an ad-hoc network, at least some use must be made of onboard clocks. Unfortunately, such devices are not inherently as accurate as might be desired, and have a variability in timing which amounts to several milliseconds across a network such as those in question.

Figure 5A:
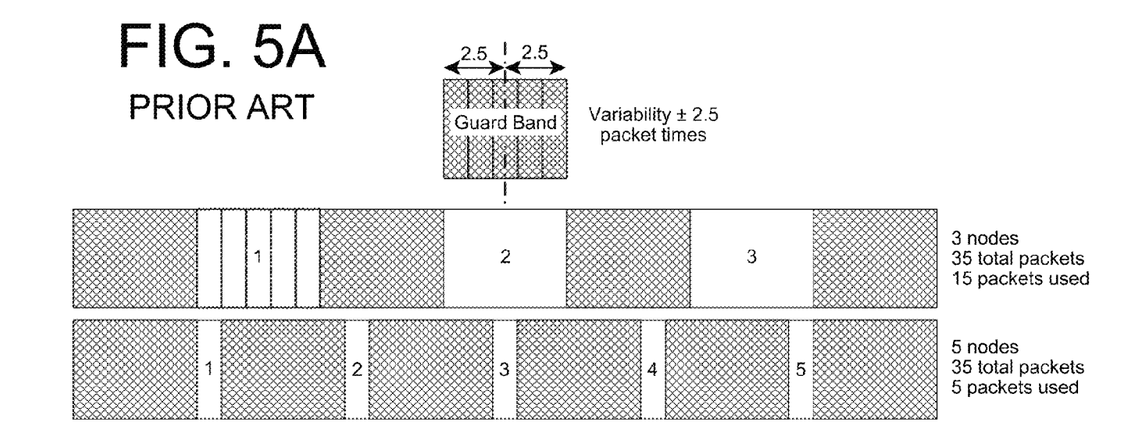
FIGS. 5A-5B show an illustrative prior art implementation of a time division multiple access (TDMA) communication solution and a modified TDMA communication solution according to an embodiment, respectively.

To address the problem, wireless TDMA approaches instantiate "guard bands" of significant width between and around all communication "slots", since there is an uncertainty of plus or minus the variability as to when a given node will believe its proper communication time begins and ends. As illustrated in FIG. 5A, at the speeds of data transfer involved here, the guard bands become a huge consumer of bandwidth. For a more concrete example, if the system is capable of transmitting at up to 1 mbps, a 32-byte packet can be transmitted in approximately 0.25 milliseconds. However, the guard band needed using the onboard clock default capabilities may be as high as several milliseconds. As a result, the system needs many times more "guard" bandwidth than actual data bandwidth when operating at maximum capacity.

To this extent, for a variability 2.5 times the packet time (e.g., 0.625 ms in the above example) a guard band that is five times the packet transmission time is required. For example, for a three node network in which each node can transmit five packets at a time, fifteen packets out of a total of thirty-five available packets can be utilized to transmit data, while the remaining twenty packets are wasted. As the number of nodes increases, the bandwidth utilized drops substantially. For a five node network in which each node can transmit one packet at a time, only five packets out of a total of thirty-five available packets can be utilized to transmit data, while the remaining thirty packets are wasted.

An approach to address this problem would be to add external crystal resonators of a very high accuracy to the nodes 12, 14 to help improve the reliability of the internal clocks, and thus reduce the needed guard band. However, such an approach adds complexity to the design and, more importantly, significantly increases the power consumption of the system. For independent wireless sensors, power consumption is a constant concern.

Figure 5B:
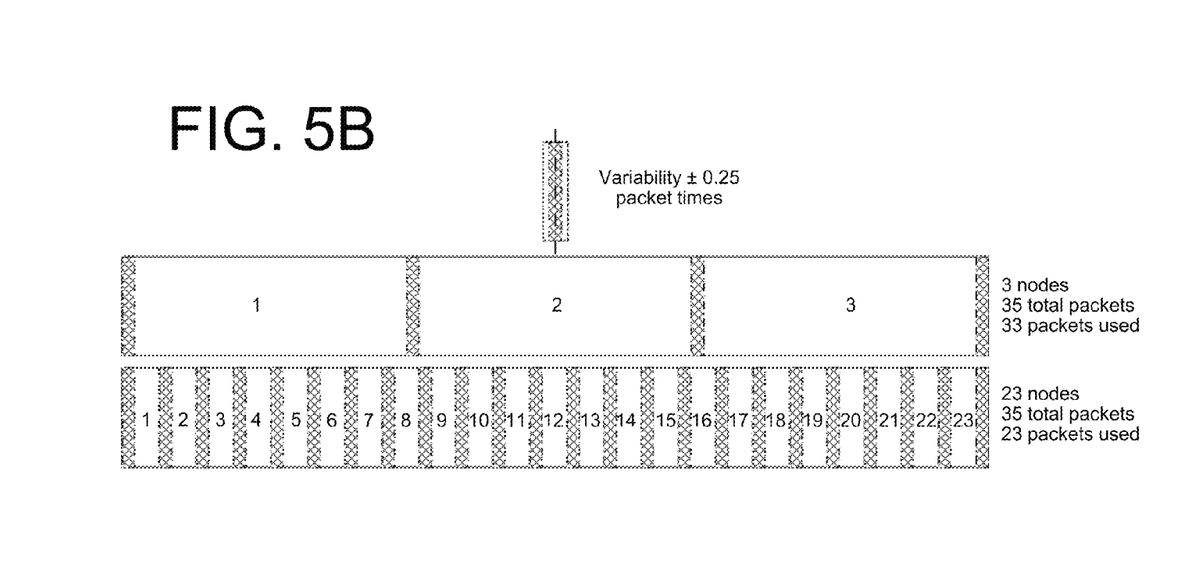

Aspects of the invention also provide an improved solution for communications between a set of sensor nodes 12 and a set of processing nodes 14. In particular, the communications can implement a unique extension of TDMA, in which processing node 14 manages the network operations. In this case, each sensor node 12 can perform an initial clock synchronization with a corresponding processing node 14 upon entry to the communications network. Additionally, each sensor node 12 can implement fine adjustments to its clock using a (e.g., software implemented) phase-locked loop (PLL), which is based on the arrival time of packets received from the processing node 14. Using this solution, sensor nodes 12 do not require external crystals to run their clocks, which results in lower power requirements and fewer components. Instead, sensor nodes 12 fine tune their internal oscillators using the PLL. As illustrated in FIG. 5B, the PLL/TDMA solution can reduce the required guard band by orders of magnitude (e.g., microseconds instead of milliseconds), thereby substantially increasing the throughput potential of the communications system.

For example, the PLL/TDMA solution can reduce the variability to within a quarter of packet transmission time, reducing the guard band to half of the packet transmission time. In this case, for a three node network, each node can transmit eleven packets at a time, which allows thirty-three packets out of a total of thirty-five available packets to be utilized in transmitting data. As the number of nodes increases, the bandwidth utilized drops, but remains relatively high when compared to the prior art solutions. For example, a network in which twenty-three nodes can transmit one packet at a time will utilize twenty-three out of a total of thirty-five available packets.

Figure 6:
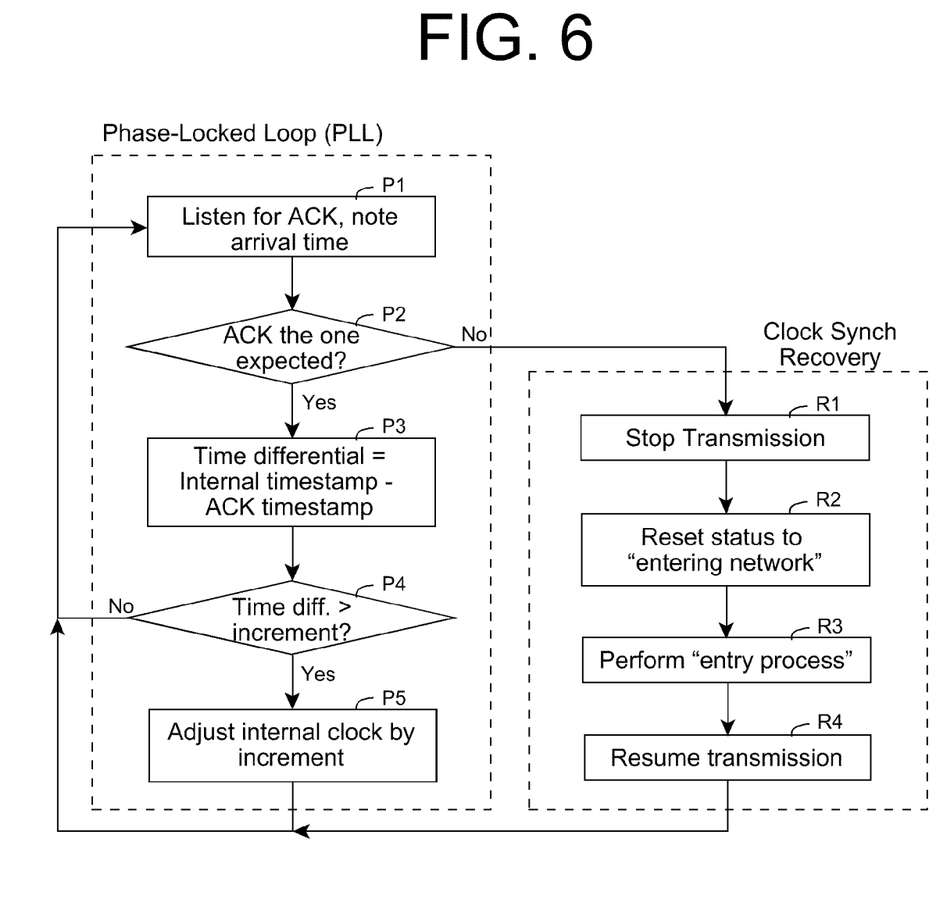
FIG. 6 shows an illustrative flow diagram for a phase-locked loop for adjusting an internal clock according to an embodiment.

FIG. 6 shows an illustrative flow diagram for a phase-locked loop (PLL) for adjusting an internal clock, which can be implemented by a sensor node 12 (FIG. 1), according to an embodiment. In process P1, sensor node 12 listens for an acknowledgment message (ACK), which is sent by processing node 14 (FIG. 1). Processing node 14 includes a timestamp for the message, which corresponds to an approximate time that the message was sent by the processing node 14 in the acknowledgement message. In process P2, sensor node 12 determines if the ACK is the one that was expected (e.g., for correct node for current time slot). If so, in process P3, sensor node 12 calculates a time differential between the timestamp on the ACK and the internal timestamp. In process P4, sensor node 12 determines if the time differential exceeds an adjustment value (increment), e.g., one half of the guard band. If so, in process P5, sensor node 12 adjusts its internal clock by the adjustment value. In either case, processing returns to process P1.

When sensor node 12 determines in process P2 that it received an unexpected ACK (e.g., the ACK was for a different sensor node for the current time slot), sensor node 12 enters into a clock synch recovery mode. In process R1, sensor node 12 stops transmitting its data and releases its current time slot. In process R2, sensor node 12 sets its status to entering network. In process R3, sensor node 12 re-enters the network to reset its onboard clock (e.g., as described herein). In process R4, sensor node 12 resumes its data transmission, and processing returns to process P1.

As discussed above, each sensor node 12 can perform an initial clock synchronization with a corresponding processing node 14 upon entry to the communications network. An embodiment provides a solution that enables a new sensor node 12 to automatically enter a communications network in a non-disruptive manner. In the solution, a sensor node 12 looking to enter the communications network does not negotiate with (e.g., ask permission of) the processing node 14 to join the network (e.g., have a time slot allocated to it). Rather, sensor node 12 uses a non-intrusive contention-based entry sequence.

Figure 7:
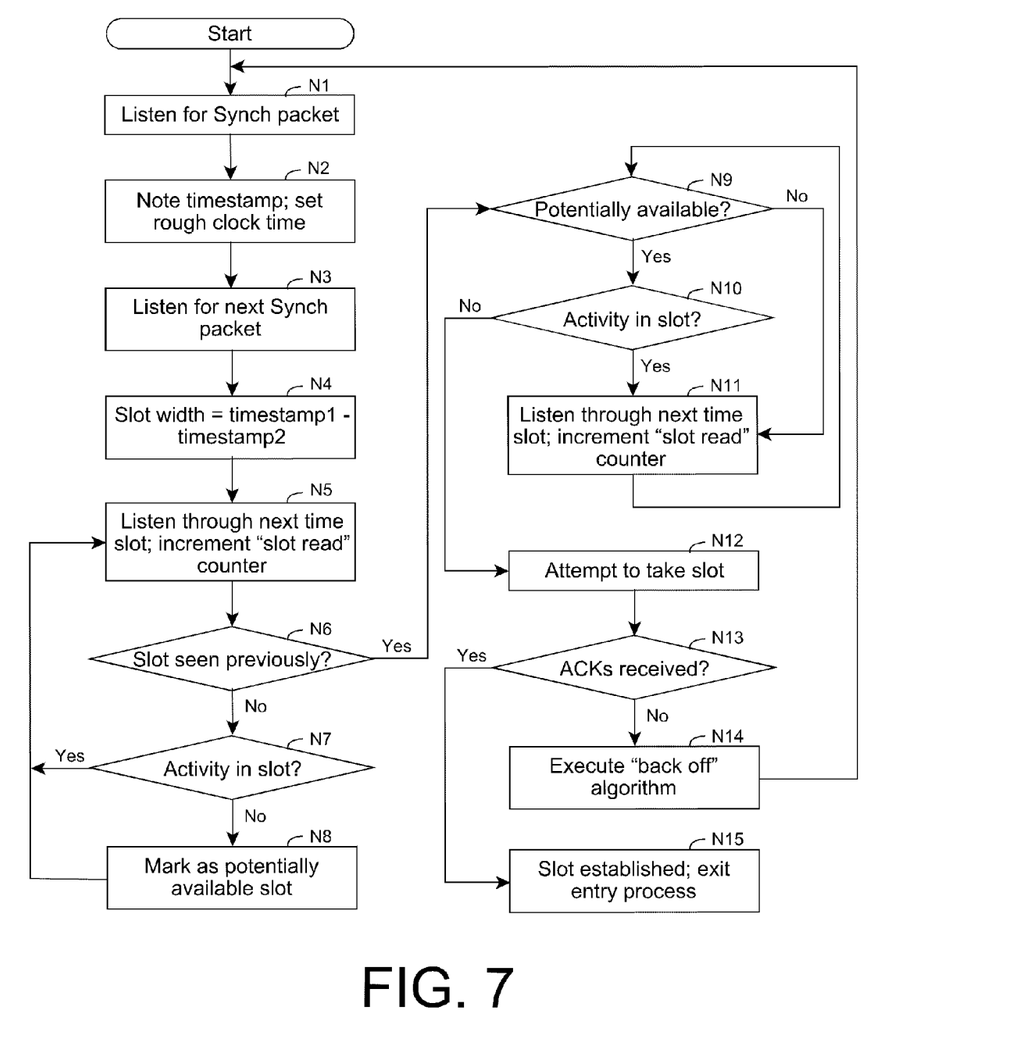
FIG. 7 shows an illustrative flow diagram for entering a communications network according to an embodiment.

FIG. 7 shows an illustrative flow diagram for entering a communications network, which can be implemented by a sensor node 12, according to an embodiment. In process N1, sensor node 12 listens for a synchronization (synch) packet. The synch packet can comprise a unique synchronization message periodically sent by processing node 14 or can be a message sent by processing node 14 that includes synchronization data (e.g., an acknowledgement message including a timestamp). In process N2, sensor node 12 notes the timestamp on the synch packet and uses the timestamp as a basic time for synchronizing its own clock. In process N3, sensor node 12 listens for the next synch packet and notes the timestamp on it. In process N4, sensor node 12 calculates the difference between the timestamps on the two synch packets and uses the difference to determine the slot width that has been set for the communications network.

In process N5, sensor node 12 listens for activity (messages) in each slot once as it passes. To this extent, in process N6, sensor node 12 determines whether a current slot has been previously seen. If not, in process N7, sensor node 12 determines whether activity is seen in the slot. If so, then sensor node 12 can mark the slot as unavailable in process N7 (which can be the default setting for each slot). If activity is not seen, in process N8, sensor node 12 marks the slot as potentially available. Once sensor node 12 determines in process N6 that all of the slots have been seen once, the sensor node 12 begins another cycle.

In process N9, sensor node 12 determines whether a slot has been marked as potentially available. If so, in process N10, sensor node 12 determines if the slot shows no activity on the second pass. If the slot has activity or was not marked as potentially available, in process N11, sensor node 12 will listen through the next time slot, and increment a counter. Otherwise, in process N12, sensor node 12 will attempt to take the slot. In particular, sensor node 12 will send a message during the slot and wait for an ACK. Sensor node 12 can repeat this for a small number of cycles (e.g., three). In process N13, sensor node 12 determines if an ACK is received for the message(s). If not, sensor node 12 presumes that the messages were lost due to data collisions, and will execute a back off algorithm in process N14. For example, the back off algorithm can comprise waiting for an (algorithmic) period of time before returning to process N1. In an embodiment, the period of time can be randomly selected to disperse attempts by different sensor nodes 12 to enter the network. However, when ACK(s) are received for the message(s), in process N15, sensor node 12 can determine that its slot is established and can exit the entry process and begin its normal transmissions. If sensor node 12 determines that no slot is available, the network is saturated, and sensor node 12 will not be able to enter the network. In an embodiment, processing node 14 can reconfigure the slots of a saturated communications network so that a slot is always available for a new sensor node 12 to enter. Further, when one or more sensor nodes 12 drop out of the network, processing node 14 can reconfigure the slots so that fewer slots are available, thereby using more bandwidth.

The network entry approach shown in FIG. 7 is contention-based, since it is possible that two or more sensor nodes 12 can simultaneously pick the same time slot in process N12, in which case their messages will collide. However, each sensor node 12 is presumably attempting to enter the network, since they were not generating any traffic during a previous occurrence of the time slot. As a result, the approach discriminates against newly entering sensor nodes 12 in favor of protecting established sensor nodes 12, which makes it nonintrusive for the established sensor nodes 12. That is, the entry of a new sensor node 12 will not have any disruptive effect on the traffic for established sensor nodes 12. It is understood that the synch and ACK messages described herein could be implemented using a single, dual use message.

An embodiment of the PLL/TDMA communications network does not provide directly for sensor nodes 12 performing relaying as is found in mesh networks. However, in applications that require a large number of sensor nodes 12 separated by distances greater than a reliable communication distance for sensor node 12 to processing node 14 communications, multiple networks can be created using multiple processing nodes 14. The processing nodes 14 can relay data to each other or to outside collection devices. In this approach, much of the guaranteed throughput of a standard mesh network is provided. However, due to the vastly smaller number of processing nodes 14, a potential for collisions and lost bandwidth is reduced. Further, the approach also provides an ability to address other applications.

Illustrative Applications

Returning to FIG. 1, in an illustrative implementation, a sensor node 12 includes two microphones, and is configured to perform speech level sampling (e.g., approximately eight kilohertz) and real-time transmission to a processing node 14. Processing node 14 was configured to process the acoustic signals to detect, track, and identify various sounds. Such a configuration can be used, for example, in security applications, maintenance/safety, and/or the like. In another illustrative implementation, a sensor node 12 is configured to sample two-axis strain, light, and acceleration of a variable geometry chevron for a jet engine, each at a rate of two kilohertz.

Figure 8:
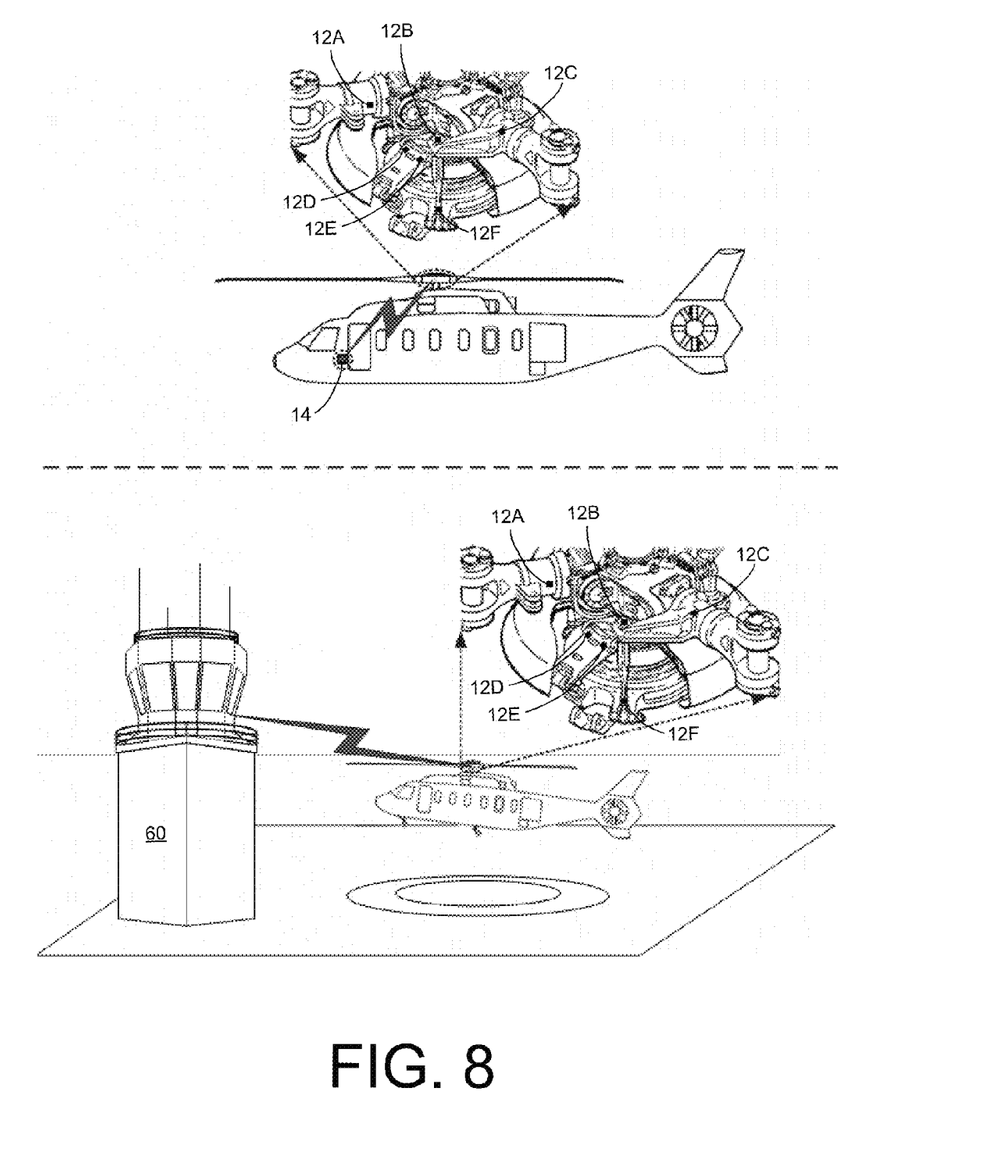
FIG. 8 shows an illustrative application for the sensor system according to an embodiment.

FIG. 8 shows an illustrative application for sensor system 10 (FIG. 1) according to an embodiment. In this application, sensor system 10 can be used as a Health and Usage Monitoring System (HUMS) and control monitoring system for a rotorcraft. To this extent, one or more sensor nodes 12A-12F can be used to acquire sensor data for one or more operating attributes of a machine component (e.g., such as stress/strain on the pitch link of a rotor for a rotorcraft, a temperature of a pitch control shaft of a tail rotor, and/or other attributes/components of the rotorcraft). The sensor nodes 12A-12F can communicate the sensor data in real time to one or more processing nodes 14, which can be deployed on the rotorcraft as illustrated in the top half of FIG. 8 and/or at a location remote from the rotorcraft (e.g., for communication after landing), such as within a control tower 60, as illustrated in the bottom half of FIG. 8. When implemented on the rotorcraft, processing node 14 can produce real-time feedback on the performance of the machine component(s) and generate a warning signal, if necessary.

Returning to FIG. 1, other applications may include multiple sensor nodes 12 scattered, e.g., by hand aircraft or the like, over an area, along with periodic placements of processing nodes 14. In this application, the sensor nodes 12 can be configured to acquire and transmit sensor data such as temperature, humidity, chemical changes, air quality, etc., to a processing node 14 in the area. The processing node 14 can collect the data and transmit the data to a monitoring system 16 (FIG. 1) periodically or in response to a trigger. The monitoring system 16 can be deployed in a low-flying manned or unmanned aircraft, a satellite, or the like.

Several networks could be implemented to cover a large area, such as a secured border, a volcanic mountain, or the like. The processing nodes 14 can relay the data collected each time period (e.g., day) to a designated monitoring system 16. In an outdoor network, both the sensor nodes 12 and processing nodes 14 can be powered by solar power, which can be stored in internal batteries, super capacitors, or the like, for use during the night if desired.

Figure 9:
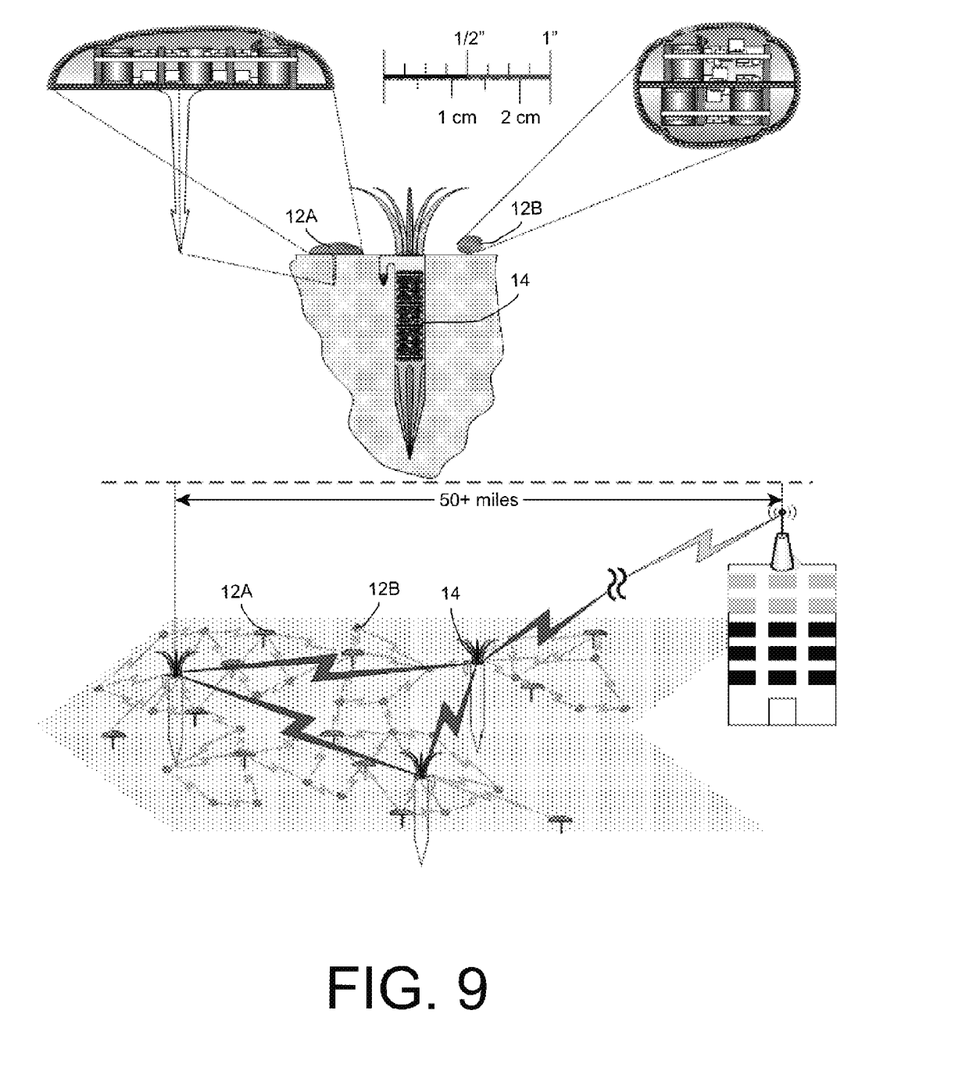
FIG. 9 shows another illustrative application for the sensor system according to an embodiment.

FIG. 9 shows another illustrative application for sensor system 10 (FIG. 1) according to an embodiment. In this application, sensor system 10 provides monitoring of a border, perimeter security, or the like. The sensor nodes 12A, 12B can include multiple configurations, e.g., including sensors such as magnetometers, geophones, and/or the like, and can be made to be concealable, e.g., by incorporating camouflaged solar cells to obtain power (e.g., in conjunction with an interior battery or super capacitor for storage during night/heavy overcast) without being readily detectable. The sensor nodes 12A, 12B can be made to appear as embedded stones, pebbles, nuts, or the like, which may be found in the application environment. Similarly, processing nodes 14 can be concealed, e.g., by being topped with some camouflaged solar-cell component which may resemble a rock, grass, a small bush, etc. Further, sensor nodes 12A, 12B and/or processing nodes 14 can include a spike, which can be driven into the ground to secure the node at a selected location.

As sensor nodes 12A, 12B would be expected to rarely have to transmit, they can be designed for higher-power, longer range transmission (duty cycle permitting higher peak-power usage in exchange for long idle periods). Similarly, processing nodes 14 can transmit more powerfully when activated, and only transmit data when an alert condition is detected or when queried by a central data network (e.g., a monitoring system 16). In an embodiment, sensor nodes 12A, 12B comprise a transmission range of approximately 150 feet, and processing nodes 14 comprise a transmission range of approximately 2-3 miles. Processing nodes 14 also can be programmed to accept and relay data from other processing nodes 14 when alerts are triggered, if the other processing node 14 is not within direct range of the central data collection system, such as monitoring system 16. In this case, a total coverage area of the sensor system can exceed fifty miles in diameter.

Returning to FIG. 1, still another application can comprise a networked manufacturing/maintenance process. In this case, a multi-component system can be assembled/maintained using tools, each of which includes one or more sensor nodes 12 configured to monitor one or more properties of the tool. The sensor nodes 12 can transmit data to a processing node 14 that is, for example, connected to a portable computing device such as a laptop, PDA, and/or the like. The processing node 14 can process the data and enable the computing device to display progress, alert to trouble spots, and/or the like. Further, the processing node 14 can communicate data to a monitoring system 16, e.g., a central manufacturing tracking/control system, which can track multiple manufacturing and/or maintenance stages, assist in scheduling/troubleshooting, maintain a history for later analysis, and/or the like. In an illustrative example, a wrench can include a sensor node 12 that includes a strain sensor and a positional/acceleration sensor. When used by a technician, the sensor node 12 can transmit location information and strain information for processing by the processing node 14. The processing node 14 can use the location and strain information to track torque applied to a particular component, a sequence of operations performed by the technician, and/or the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A sensor node comprising:
   a core component configured to enable modular manufacture of the sensor node, the core component including:
   a power interface configured to selectively physically connect the core component to any one of a plurality of types of power components when assembling the sensor node, wherein the plurality of types of power components include at least one direct current power component and at least one alternating current power component;
   a sensor interface configured to selectively physically connect the core component to any one of a plurality of types of sensor components when assembling the sensor node;

a microprocessor configured to process sensor data; and
a wireless transceiver configured to communicate data;
a sensor component connected to the sensor interface, the sensor component including at least one sensor for acquiring the sensor data; and
a power component connected to the power interface, wherein the power component is configured to supply at least one of: direct current power or alternating current power to the sensor node.

2. The sensor node of claim 1, wherein the power component supplies all of the power for the sensor node without access to any external power sources and wherein the power is less than two milliwatts.

3. The sensor node of claim 1, wherein the at least one sensor acquires at least 4,000 data samples per second, and wherein the transceiver transmits the at least 4,000 data samples per second.

4. The sensor node of claim 1, wherein the core component further includes a memory interface configured to selectively connect a storage component.

5. The sensor node of claim 1, wherein the sensor component includes at least one switch configured to enable programmatic shutdown of the at least one sensor component by the microprocessor.

6. The sensor node of claim 1, wherein the sensor component includes a plurality of sensors, each sensor configured to sense changes for a unique parameter.

7. The sensor node of claim 1, wherein the sensor node is configured to communicate with a processing node using Time Division Multiple Access, and wherein the sensor node is configured to synchronize an internal clock with an internal clock of the processing node using an arrival time of a packet received from the processing node and a timestamp included in the packet.

8. A sensor system comprising:
a sensor node including:
a core component including:
a power interface configured to selectively connect the core component to any one of a plurality of types of power components when assembling the sensor node;
a sensor interface configured to selectively connect the core component to any one of a plurality of types of sensor components when assembling the sensor node;
a microprocessor configured to process sensor data; and
a wireless transceiver configured to communicate data;
a sensor component connected to the sensor interface, the sensor component including at least one sensor for acquiring the sensor data; and
a power component connected to the power interface, wherein the power component is configured to supply power to the sensor node; and
a processing node configured to receive sensor data from the sensor node and process the sensor data, wherein the sensor node communicates with the processing node using Time Division Multiple Access, and wherein the sensor node synchronizes an internal clock with an internal clock of the processing node using an arrival time of a packet received from the processing node and a timestamp included in the packet.

9. The sensor system of claim 8, the processing node including:
a microprocessor configured to process the sensor data;
a transceiver interface configured to selectively connect a transceiver component, wherein the transceiver component enables wireless communication with the sensor node; and
a communications interface configured to enable communications between the processing node and at least one computing device distinct from the sensor node.

10. The sensor system of claim 9, wherein the communications interface is further configured to supply power to the processing node and enable wired data transmission between the processing node and the at least one computing device.

11. The sensor system of claim 8, wherein the processing node includes a power component configured to supply all of the power for the processing node without access to any external power sources.

12. The sensor system of claim 8, wherein the plurality of types of power components include at least one direct current power component and at least one alternating current power component capable of powering the core component.

13. A system comprising:
a plurality of nodes, each of the plurality of nodes including:
a core component including:
a power interface configured to selectively connect the core component to any one of a plurality of types of power components when assembling the sensor node;
a sensor interface configured to selectively connect the core component to any one of a plurality of types of sensor components when assembling the sensor node;
a microprocessor configured to process sensor data; and
a wireless transceiver configured to communicate data
a sensor component connected to the sensor interface, the sensor component including at least one sensor for acquiring the sensor data; and
a power component connected to the power interface, wherein the power component is configured to supply power to the sensor node; and
a central node, wherein the plurality of nodes communicate with the central node using a Time Division Multiple Access (TDMA) communications network.

14. The system of claim 13, wherein each of the plurality of nodes synchronizes an internal clock with an internal clock of the central node using an arrival time of a first packet received from the central node and a timestamp included in the first packet during entry into the TDMA communications network, and wherein each of the plurality of nodes subsequently maintains synchronization between the internal clock of the node and the internal clock of the central node using an arrival time for a subsequent packet and a time slot assigned for the subsequent packet in the TDMA communications network.

15. The system of claim 14, wherein the first packet comprises an acknowledgement message sent by the central node to any one of the plurality of nodes.

16. The system of claim 14, wherein each of the plurality of nodes implements a phase-locked loop to periodically adjust its internal clock to maintain synchronization using the arrival time for the subsequent packet and the time slot assigned for the subsequent packet in the TDMA communications network.

17. The system of claim 13, wherein a new node enters the system using a non-intrusive contention-based entry sequence.

18. The system of claim 17, wherein the non-intrusive contention-based entry sequence includes identifying a plurality of slots in the TDMA communications network, determining whether at least one slot in the plurality of slots is potentially available, and sending a message for processing by the central node during the at least one slot.

19. The system of claim 13, further comprising:
   a relay node in communication with the central node; and
   a collection device in communication with the relay node, wherein the relay node receives data from the central node and forwards the data for processing by the collection device.

20. The system of claim 19, further comprising a second plurality of nodes distinct from the plurality of nodes, wherein the second plurality of nodes communicate with the relay node using a second Time Division Multiple Access (TDMA) communications network distinct from the TDMA communications network.

\* \* \* \* \*